UNITED STATES PATENT OFFICE.

WM. E. LOCKWOOD, OF PHILADELPHIA, PENNSYLVANIA, ASSIGNEE, BY MESNE ASSIGNMENTS, OF WALTER HUNT.

IMPROVEMENT IN SHIRT-COLLARS.

Specification forming part of Letters Patent No. 11,376, dated July 25, 1854; Reissue No. 1,828, dated November 29, 1864.

DIVISION B.

*To all whom it may concern:*

Be it known that I, WILLIAM E. LOCKWOOD, of Philadelphia, Pennsylvania, am the owner of certain Letters Patent for an Improvement in Shirt-Collars, granted to WALTER HUNT on the 25th day of July, 1854, that I deem the said patent inoperative and invalid by reason of a defective specification, and that the following is a full, clear, and exact description of part of the said invention, which consists of a shirt-collar composed of paper and muslin or its equivalent, so combined and so polished or burnished that the collar shall not be readily torn or broken at the parts subjected to the greatest strain, shall be sufficiently elastic, shall have the whiteness and brilliancy of the most carefully dressed linen collar, for which the improved collar forms a cheap substitute.

To enable others skilled in the art to which this invention most nearly appertains to make use of the said invention, I will now proceed to describe the manner of constructing the same.

White paper properly prepared presents a more smooth and glossy surface, and one which is less liable to attract dust and dirt and absorb perspiration and other moisture, than the most carefully starched and ironed linen. With a full knowledge of this fact the said WALTER HUNT determined to apply this smooth and polished white paper to the manufacture of shirt-collars, shirt-bosoms, and other articles of wearing-apparel, with the view of substituting the cheaper paper article for the more expensive one of linen, and of saving the time occupied and wear and tear which takes place in washing, starching, and ironing ordinary linen collars. The fragile nature of paper, its liability to crack and to tear at the button-holes, rendered it necessary to stiffen and make it more tough and elastic by combining it with textile fabrics or submitting it to other stiffening or strengthening processes. The said HUNT took sheets of thin white paper, and by means of paste, glue, or other appropriate sizing, secured one sheet of paper to one side and the other to the opposite side of thin white cotton, muslin, or other textile fabric or fibrous material not readily torn. The fabric was then polished and rendered more stiff and elastic by subjecting it to the action of calender-rollers, rubbing it with an agate burnisher, or other suitable means. The collars or other articles of wearing-apparel were then cut or stamped out, and were made in one piece or in two or more pieces, the separate portions being afterward glued or pasted together and finally provided with suitable button-holes.

Among the advantages which the improved collars present are the following: First, they have a smooth, glossy, and pure white surface; second, they can be worn much longer than ordinary laundry-dressed linen collars; third, they may be made and sold at a price less than the cost of washing, starching, and dressing linen collars.

I have heretofore alluded to the invention as particularly applicable to shirt-collars; but it is evident that it is equally well adapted to shirt-bosoms, wristbands, &c.

I claim as the invention of the said WALTER HUNT and desire to secure by Letters Patent as a new manufacture—

A shirt-collar composed of paper and muslin or its equivalent, and polished or burnished, substantially as and for the purpose described.

In testimony whereof I have signed my name to this specification before two subscribing witnesses.

WILLIAM E. LOCKWOOD.

Witnesses:
HENRY HOWSON,
JOHN WHITE.